United States Patent [19]

Bond

[11] Patent Number: 4,722,374

[45] Date of Patent: Feb. 2, 1988

[54] METHOD FOR FABRICATING WOODEN CIRCULAR STAIR WITH BALUSTRADE

[76] Inventor: Henry J. Bond, P.O. Box 469, Somerset, Va. 22972

[21] Appl. No.: 896,401

[22] Filed: Aug. 14, 1986

Related U.S. Application Data

[63] Continuation of Ser. No. 795,545, Nov. 6, 1985, Pat. No. 4,655,017.

[51] Int. Cl.$^4$ ............................................. B27F 7/00
[52] U.S. Cl. .................................... 144/345; 52/187; 52/731; 144/353; 144/355; 144/365; 144/371; 144/3 R; 403/248; 403/263
[58] Field of Search ................... 52/187, 730, 731; 403/248, 251, 263; 144/344, 345, 353, 355, 371, 365, 3 R

[56] References Cited

U.S. PATENT DOCUMENTS 1,000,822  8/1911  Kyle ........................................ 52/731
3,513,547  5/1970  Sackno .................................... 52/187

FOREIGN PATENT DOCUMENTS 1455924  11/1976  United Kingdom ................. 52/187

Primary Examiner—W. D. Bray
Attorney, Agent, or Firm—W. Brown Morton, Jr.

[57] ABSTRACT

A wooden spiral staircase having a hollow central support column, treads which abut but do not attach to such column, tread supports ending in tenons which completely intersect the column and are secured by a wedged-through mortise joint, spacerblocks between every two adjacent treads and under the bottommost tread, and an optional laminate bent handrail and optional balusters which serve no support function, enabling the manufacturer to construct and ship the main body of the staircase as a single unit that can easily be installed through "screwing" it through the doorway(s) of the intended site. The method of constructing such a staircase in which the placement of the mortises on the central column is determined by the use of a computer generated template, thereby allowing for every staircase to be custom-designed as well as ensuring extreme precision in the final product.

3 Claims, 10 Drawing Figures

METHOD FOR FABRICATING WOODEN CIRCULAR STAIR WITH BALUSTRADE

This application is a continuation of my earlier-filed, copending application Ser. No. 795,545, filed Nov. 6, 1985, U.S. Pat. No. 4,655,017.

FIELD OF THE INVENTION

This invention relates to spiral staircases made of wood, and to improved methods of constructing the same.

DESCRIPTION OF THE PRIOR ART

The ever-increasing cost of construction on a "per square foot" basis makes spiral staircases, which occupy approximately 20 percent less floor space than is required for a conventional stair, an attractive option for those building or renovating a house. For aesthetic reasons, wooden spiral staircases tend to be preferred over metal ones in the home.

The subject invention features a free-standing spiral staircase with a hollow central support column. Tread supports are secured to this column by a wedged mortise joint. The mortise extends all the way through the column and the tenon is slit to receive the wedges from the side of the column opposite from the support proper. A laminate bend handrail, unsurpassed in strength and stability, is also featured, with such handrail being molded through direct attachment, while still wet, to the staircase itself. The staircase is custom-designed for each customer. Computer-generated templates are used to locate on the column the proper placement of holes for the tenon ends of the treads supports, thereby allowing the manufacturers to adjust rotation and rise to conform precisely to the customer's floor plan and traffic patterns.

A number of patents are directed to improvements in the design, manufacture, and assembly of metal or primarily metal circular stairways. See, for example, the inventions of Holden (U.S. Pat. No. 839,846), Allmand (U.S. Pat. No. 3,418,770), MacKay (U.S. Pat. No. 3,667,176) and Schneider (U.S. Pat. No. 3,740,906).

Fewer patents address improvements in the wooden spiral staircase. Of those that do, the closest to the present invention are Geleijnse et al. (U.S. Pat. No. 3,964,222), and Suckno (U.S. Pat. No. 3,513,547).

The Geleijnse patent discloses a round central column and a T-shaped riser that adjoins an upper and lower tread. The column is solid wood, with mortises cut or drilled more than halfway into, but not through the column. One end of each of the T-shaped tread carriers serves as a tenon which fits into the appropriate mortise in the central column. A major drawback with this design is that the bottom part of each of the T-shaped tread carriers joins the upper surface of the next lower down tread, thereby posing a potential interference to the feet of someone climbing or descending the stairs. The subject invention avoids this disadvantage. Furthermore, unlike the spiral stairway designed by Geleijnse et al., in which the balusters provide structural support for the outer extremity of the treads, and therefore have to be installed prior to shipment, the balusters in the subject invention are not structural support members and are not installed before shipment. The handrail is temporarily clamped directly to the treads for shipment. The staircase in this "broken down" mode can then usually be "screwed" through standard door frames to bring it inside the structure.

The Suckno patent, like that of Geleijnse, features a solid wood central column. Both the treads themselves and vertical tread supports or braces are joined to the column by bolts screwed approximately halfway into the column. In contrast, the subject invention features a hollow column which, while probably lighter in weight, is larger in circumference and thus sturdier than those of Geleijnse et al. and Suckno. Applicant's mortises are drilled from both sides through to the hollow center of the column; tenons on the tread supports are then inserted through the mortises and wedged permanently in place in slits in the tenons from the side of the column opposite the support. In applicant's staircase the treads proper need not be fastened to the column. The outermost sections of applicant's treads are joined together through the use of "spacerblocks," similar in function to the outer edge braces disclosed in the Suckno patent. A key distinction between the two is that in the subject invention, the spacerblocks do all the work in distributing the load when the staircase is in use, while in the Suckno stairway, the outer end braces and balusters are both involved in such load distribution. Because its balusters play a structural support function, the Suckno staircase cannot be as easily shipped and installed as the one in the applicant's invention.

OBJECTS OF THE INVENTION

It is a principal object of the present invention to provide a wooden spiral staircase which is aesthetically pleasing, of simple line and yet extremely sturdy, easy to build, assemble, ship and install, and which can be economically and precisely custom designed to meet the specific requirements of its application through use of computer assisted design technology and other commercially available computer software.

It is a further object of the present invention to provide a wooden spiral staircase of which the entire structural support system can be assembled at the place of manufacture, and thereafter shipped and installed, with the user being required to provide only minimal assembly of non-structural items, thus increasing not only the convenience of the user but giving the manufacturer additional control over the safety of the staircase.

It is a further object of the present invention to provide a wooden spiral staircase of which the handrail is made of laminated wood formed by clamping the composite of wet glued strips directly to the erected stair itself, so as to eliminate the need for a special "form", while allowing for an infinite range of possible diameters and, most importantly, a perfect fit of rail to stair.

It is a further object of the present invention to provide a wooden spiral staircase of which the assemblage is facilitated through use of tenons which completely intersect a hollow column, and further facilitated through the use of oblate tenons, thereby allowing mortises to be formed by routing oblate holes or by drilling three holes sie-by side, eliminating the need for time-consuming chiseling out of the corners of the mortises as is required with the use of traditional rectangular tenons.

It is a further object of the present invention to provide a wooden spiral staircase of which the central column is hollow, being comprised of individual pieces of wood which have been glued together and then sanded to arrive at the finished diameter.

SUMMARY OF THE INVENTION

An improved spiral staircase, with improved methods of construction incorporating various features, including computerization, that enhance precision while cutting down on labor time and cost of materials.

The central support column is comprised of continuous pieces of stock, glued and clamped together, with edge joints reinforced by hardwood dowels. A wooden block is inserted into each end of the column and secured by lag-screws in order to prevent separation of the individual components.

The column is turned in a lathe and then sanded until its finished diameter is reached. A computer-generated template is next used to mark the mortise locations on the column, following which the various mortises are drilled. Because the tenons on the tread supports are oblate, the mortises can be made by routing oblate holes or by drilling three holes side-by-side, and then chiseling out the slight triangular bits on either side of the center hole.

To assembly the stair, tread supports are inserted into the mortises and wedged permanently in place. Treads are fastened to the supports via countersunk and plugged lag screws. Spacerblocks, used to distribute load, are then inserted between adjacent treads the entire length of the staircase. Next the spiral handrail is constructed using a laminating process whereby numerous layers of wood strips are glued together. While it is wet with glue, this handrail is transferred to the stair and clamped to the treads. After the glue has cured the handrail is cleaned and shaped, and balusters are fitted.

BRIEF DESCRIPTION OF THE DRAWINGS

The above-described features of the present invention are explained in the detailed description below. It is to be read in conjunction with the accompanying drawings in which.

DETAILED DESCRIPTION OF THE DRAWINGS

Figure 1:
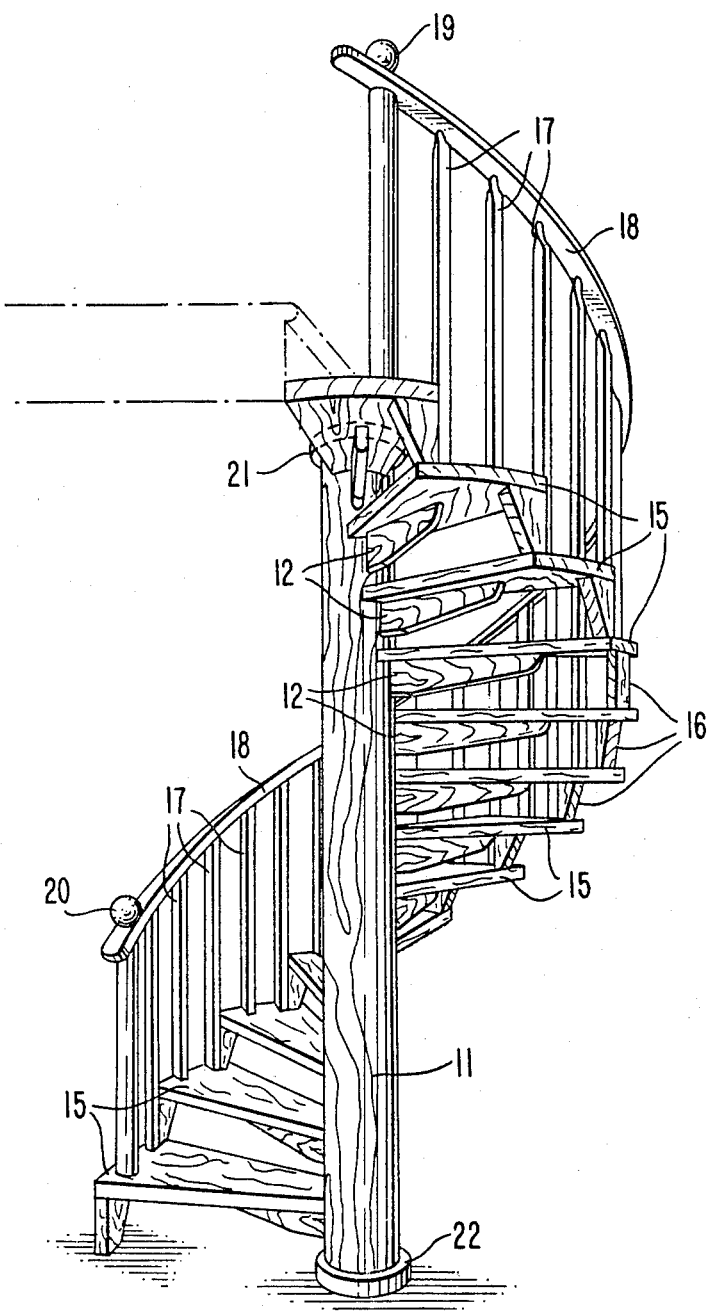
FIG. 1 is a perspective view of the finished spiral staircase.

FIG. 1 presents an overall view of the spiral staircase completely assembled, 10. The staircase consists of the following principal parts: a hollow central support column, 11, to which tread supports, 12, are attached by means of oblate tenons, 13, which completely intersect the column, and are then wedged in place by two horizontal compression wedges, 14 inserted in the ends of the tenons opposite the support proper; treads, 15, which are attached to the tread supports and which abut, but do not attach to, the central column at their narrow end; and spacer-blocks, 16, which join adjacent treads at the outermost sections. The above elements comprise the structural components of the staircase. Additional features of the staircase shown in FIG. 1, some or all of which may be deleted at the option of the customer, are: balusters, 17, two to a tread; a laminate handrail, 18; an upper newel post, 19; a lower newel post, 20; a column cap; 21; and a base trim collar, 22. In the preferred embodiment, cabinet grade red oak is used for all visible parts of the staircase.

Figure 2:
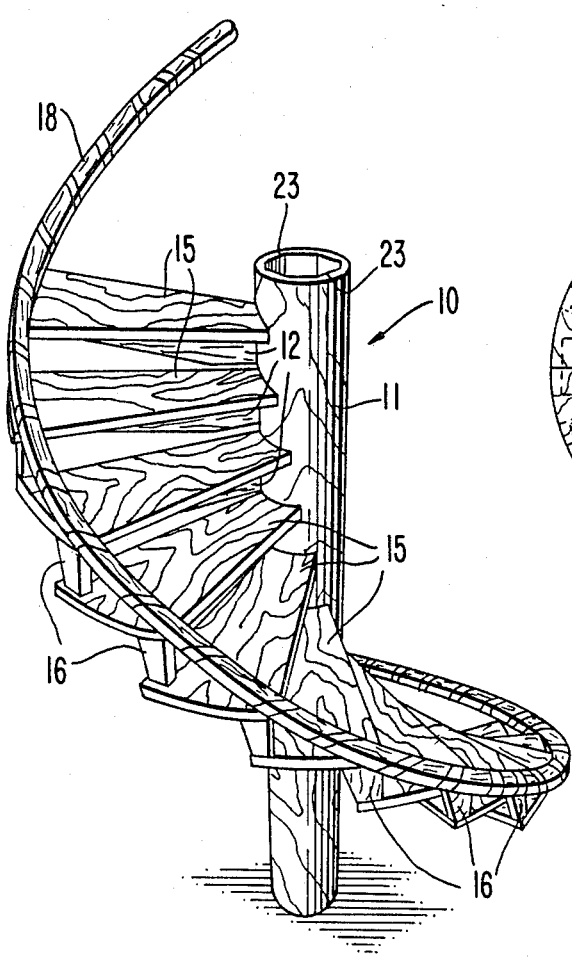
FIG. 2 is a perspective view of the spiral staircase in "broken down" form, ready for shipment and installation.

FIG. 2 shows the same essential structure as FIG. 1, the major difference being that the balusters have been removed and the handrail tied directly to the stair treads in FIG. 2. The staircase is shipped in this "broken down" form. Due to its spiral shape it may be "screwed" through a standard door opening in most cases, allowing for rapid installation.

FIG. 2 also gives an idea of how the staircase looks when the newly laminated handrail is drying. As in the illustration, the handrail is attached to the stairtreads, but clamps are used rather than rope or tape, and the rail is preferably covered with a protective material, such as plastic sheeting, to keep glue off the rest of the staircase.

Figure 3:
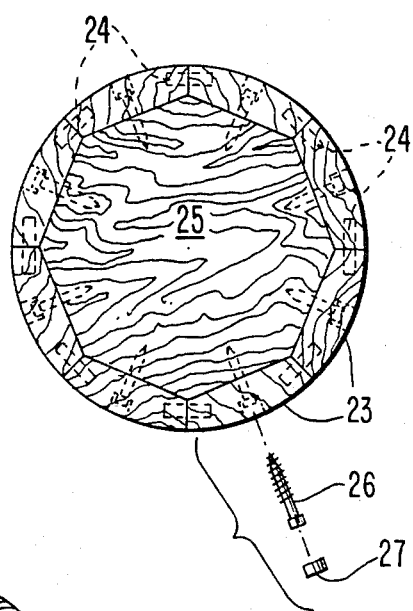
FIG. 3 is a top plan view of the central column.

FIG. 3 presents a top plan view of the central column. In the preferred embodiment, as shown, eight pieces of wood, 23, of continuous stock and measuring 1¾", are ripped to 22.5 degree bevel and are glued and clamped to form an octagon. As a backup measure in case of glue failure, all edge joints are reinforced by hardware dowels, 24. The dowels measure $\frac{1}{2}" \times 2"$ in the preferred embodiment. These dowels are glued in their respective holes on centers exactly equal to the individual rise of a tread to tread interval. They are offset from the mortises to insure their integrity after drilling, and are totally concealed from view. In a typical stair of 13 treads there are 112 of these dowels $(8 \times (13+1))$.

Figure 3A:
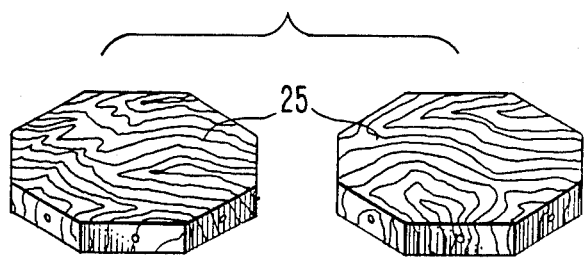
FIG. 3A is a perspective view of the wood blocks to be inserted into the end of the central column.

After construction of the column blank, two wood blocks, 25, as shown in FIG. 3A, are inserted into each end and retained by lagscrews, 26, countersunk through the faces of the column and covered by wood plugs, 27. In the preferred embodiment, the wood blocks would be octagonal and made of maple. These blocks are intended to prevent the separation or splaying of the individual components, or "staves". They serve a function similar to the hoops of a barrel. They also are entirely concealed in a finished installation.

Figure 8:
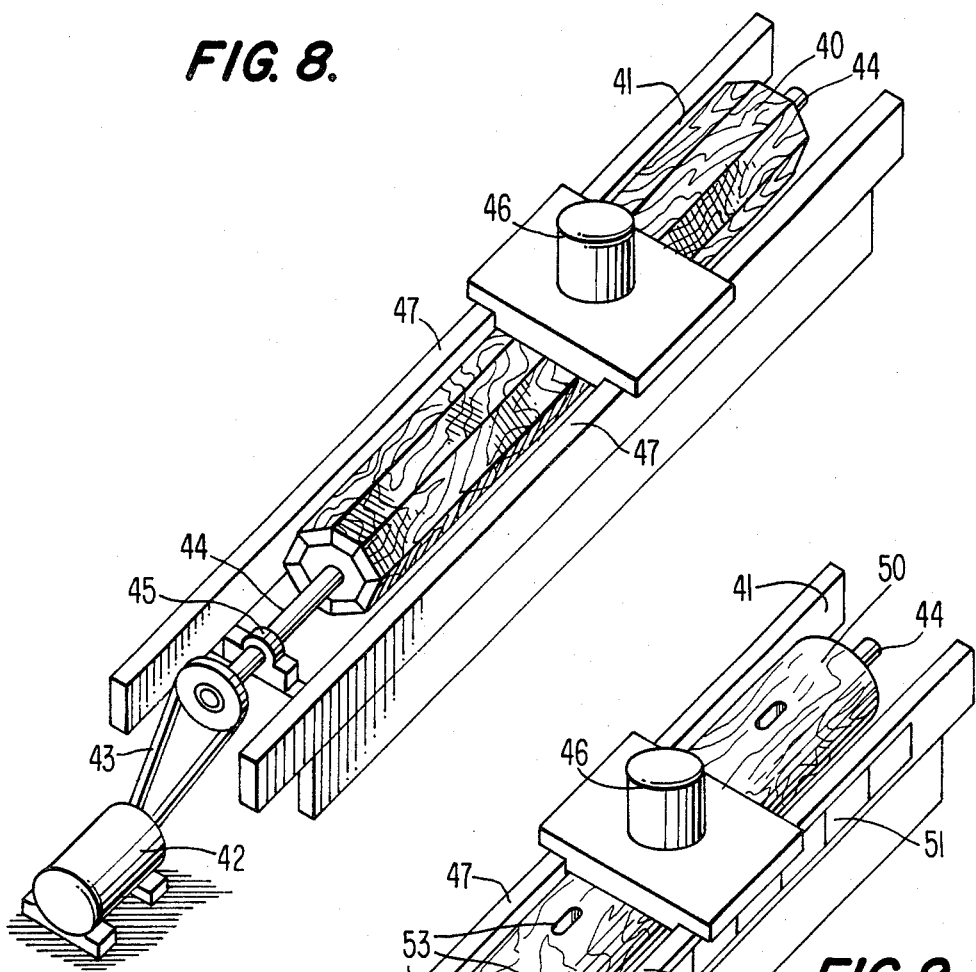
FIG. 8 is a partial perspective view of the lathe apparatus containing the central column octagonal workpiece after gluing but before "turning" the column and routing the workpiece into a cylindrical column.
Figure 9:
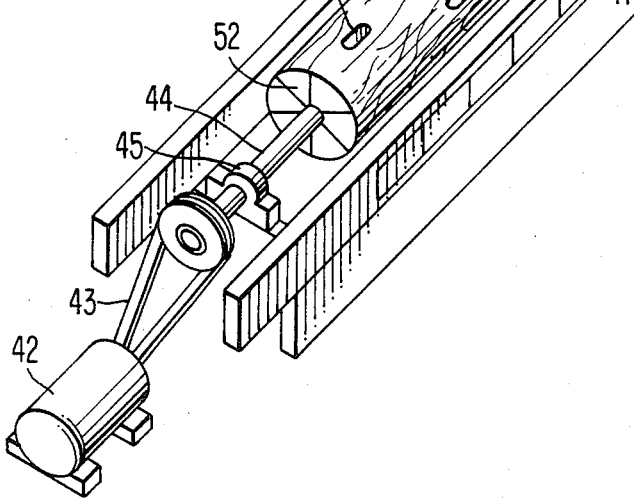
FIG. 9 is a partial perspective view of the column in the lathe during the process of routing the mortises in the column.

The octagonal column 40 is mounted in a "lathe" 41 as shown in FIG. 8 and turned to a nearly finished diameter. More specifically, this "lathe" consists of a motor 42 to supply rotation to the column via sheaves and "V" belts 43. Each end of the column 40 is fastened to a ⅝" shaft 44 mounted in bearings 45. A commercial router 46 rides tracks 47 that are parallel to the axis of rotation to enable the removal of stock until a cylindrical column 50 is obtained as shown in FIG. 9. The column is then sanded to arrive at the finished diameter. In the preferred embodiment, this is 10 inches.

After turning, the mortising process is initiated as shown in FIG. 9. With the column 50 still mounted in the lathe 41 a commercial radial drill press or a router 46 is fastened to the tracks 47. The mortise locations are determined by combining the rise interval with the angular interval. These intervals are calculated for each stair. This allows the manufacturer to remain very flexible and offer a truly custom product to its customers. The riser locations are marked on a scrap strip of material 51 full scale and affixed to the track 47. A computer generated "degree wheel" 52 is laminated to a piece of plywood, preferably $\frac{1}{4}''$, and affixed to an end of the column 50.

Computer generation of the "degree wheel" is performed by standard Computer Aided Drafting (or Design) (CAD) methods such as the AutoCAD Drafting Package, version 2.1x and available in several versions from Autodesk, Inc. which runs on the IBM PC and compatible personal computers operating under widely available and known operating systems PC-DOS and MS-DOS.

By advancing one interval on the degree wheel and one rise interval simultaneously, the mortises 53 are drilled or routed in exactly the proper location with respect to one another. The necessity for accuracy here is demonstrated by the fact that the circumference of a six foot stair is 226 inches. One degree at the circumference is then equal to 0.64 inch. If, for example, the interval is $\frac{1}{2}$ degree greater than calculated the cumulative effect over 14 intervals would be $(0.64 \times 14)/2$ or about 4.5 inches. It is possible to maintain error to 1/10 degree through the use of the computer. This accuracy is not possible with manual layout techniques.

Figure 4:
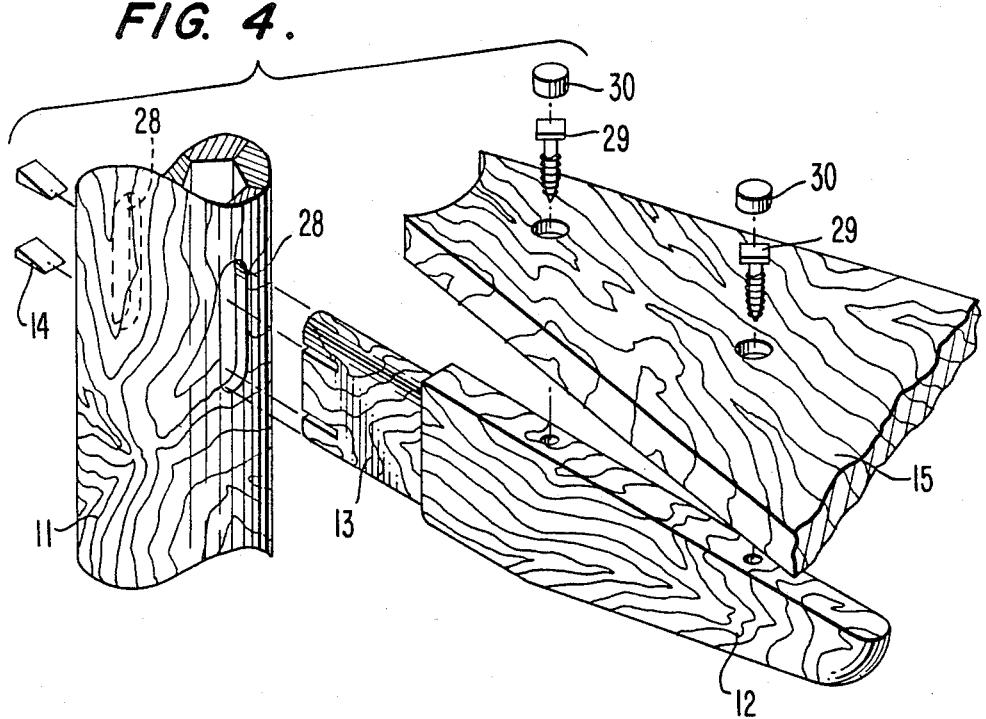
FIG. 4 is a partial exploded perspective view illustrating the manner in which the tread support is connected to the central column and the tread proper is connected to the support.

After mortising, the stair is assembled. As FIG. 4 illustrates, tread supports, 12, ending in oblate tenons, 13, are inserted into the mortises, 28, and wedged permanently in place through the use of horizontal compression wedges, 14. Treads are fastened to the supports via countersunk lag screws, 29, plugged with wood plugs, 30.

Figure 5:
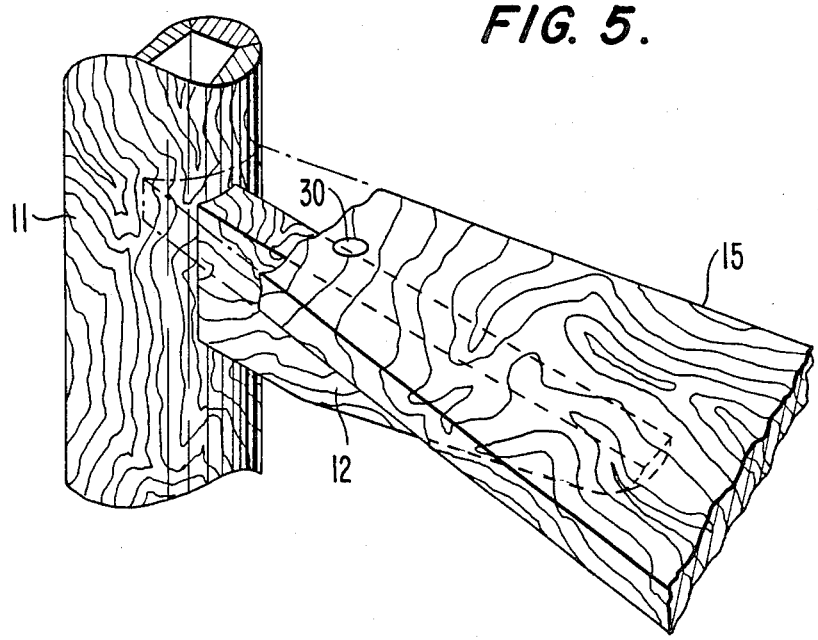
FIG. 5 is a perspective view of a tread and tread support, with the support's mortised joint wedged to, and causing the inner end of the tread to abut the central column.

FIG. 5 shows the appearance of a tread with the mortised joint of its support inserted through the column to cause the inside end of the tread to abut the central column.

Figure 6:
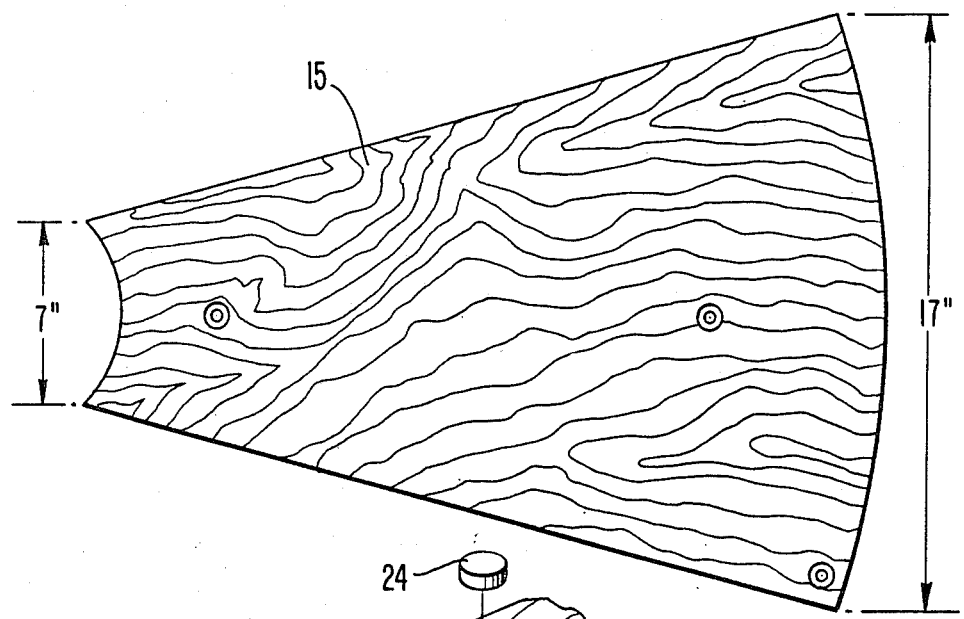
FIG. 6 is a top plan view of a tread.

A typical tread, made of solid wood, is shown in FIG. 6. The standard taper is from 7" at the narrow inside end to 17" at the outer circumference. This standard tread may be used in a variety of stairs.

Figure 7:
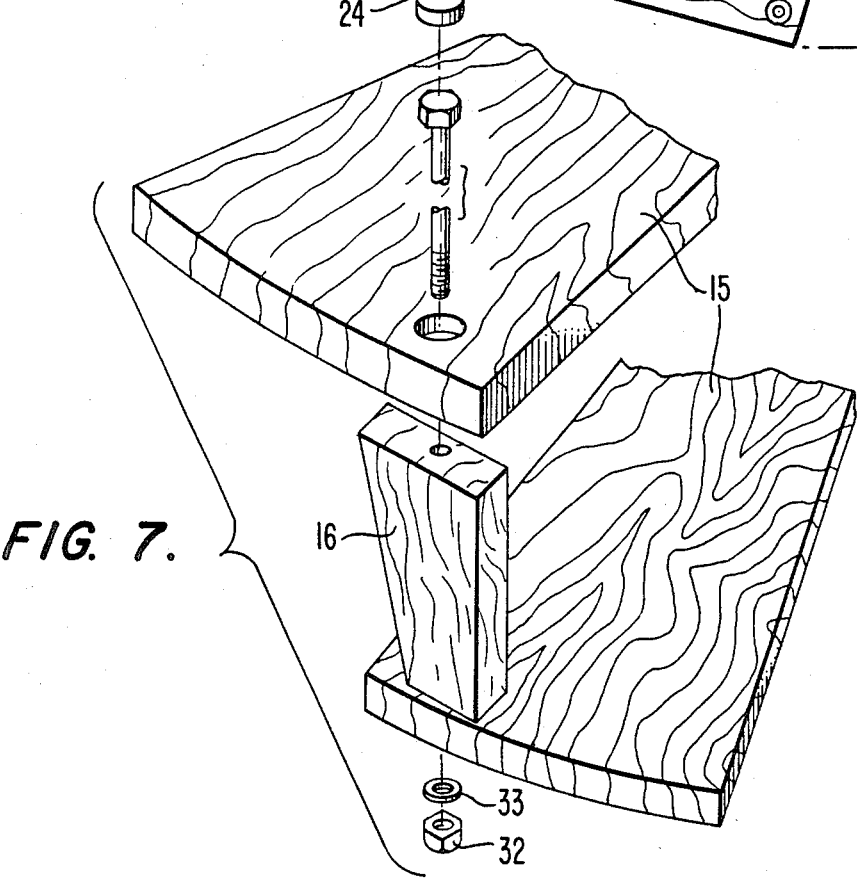
FIG. 7 is a partial exploded perspective view illustrating the manner in which a spacerblock is secured between adjacent treads.

The only modification required to adapt a tread to a specific stair is a determination of the location of the spacerblocks, 16. These blocks attach between two adjacent treads and act as bridging. They tie the outermost section of treads together. In use they function as follows: as the leading edge of one tread is loaded, the tread attempts to pivot on the tread support forcing the trailing edge up. The spacer transfers this force to the tread above it forcing the leading edge up and the trailing edge down. This results in half of the blocks of the entire stair being in a state of compression and half in a state of tension. The forces are thus distributed throughout the entire stair system. These blocks are crucial to the function of the stair. As FIG. 7 shows, the blocks are secured in place by a piece of threaded rod, 31, that runs entirely through the two associated treads and the spacerblock. Nuts and washers, 32, 33, are welded to the rod and countersunk and plugged, using wood plugs 34.

The components are now a unit that can no longer be dissassembled.

The next step is construction of the spiral handrail, 18. Typically, permanent and inflexible forms are used to mold such handrails. Part of the subject invention is that the erected stair itself is used as the form. This eliminates the need to build large and space wasting forms, making an infinite range of diameters possible, and assures a perfect fitting of rail to stair. The handrail is built up of numerous layers of wood strips. In the preferred embodiment, 16–20 layers of $\frac{1}{8}'' \times 2''$ oak strips are used. Glue is applied between layers and the package is transferred to the stair and clamped in place.

After the glue has cured the handrail is cleaned and shaped. Balusters, 17, are fitted and construction is essentially complete. Such optional features as an upper newel post, 19, lower newel post, 20, a column cap (being a wooden cover for the top of the column), 21, and a base trim collar, 22, may be added if desired.

I claim:

1. The method of fabricating a wooden circular stair having a free-standing hollow central support column assembled of a plurality of full-length staves of rectilinear cross-section glued together and a plurality of radial tread supports mortised to the column at right angles to its axis which comprises mounting the assembled column in a lathe, turning it to circular cross-section, sanding it, and drilling or routing radial mortises for the support tenons diametrically through the column using first either a router or a drill press carried by a track mounted clear of the column parallel to the lathe axis, the location of the mortises longitudinally along the axis and radially around the circumference of the column being determined by a Computer Assisted Design or CAD technique using the parameters of the specific installation for which the staircase is intended.

2. The method of claim 1 including determining for axial spacing according to the rise interval appropriate for the installation and the angular spacing according to the number of supports for the installation.

3. The method of claim 2 further comprising marking the axial intervals for positioning the mortises on a strip affixed to the track, and marking the radial intervals for positioning the mortises on a "degree wheel" affixed at right angles to the axis and to one end of the column being routed.

* * * * *